March 14, 1961     E. C. GREANIAS     2,975,371
CLIPPING LEVEL CONTROL CIRCUIT

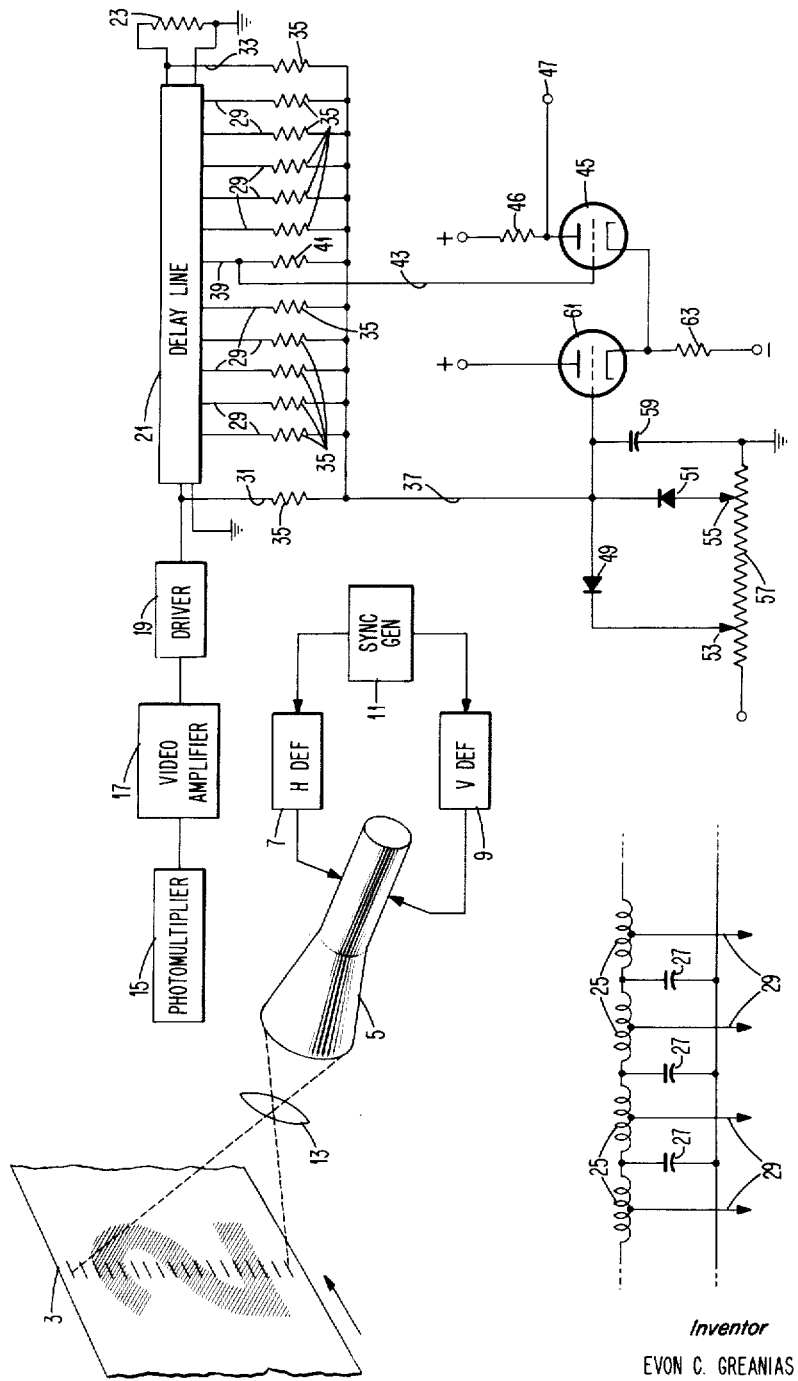

Filed Nov. 24, 1958     2 Sheets-Sheet 2

United States Patent Office 2,975,371
Patented Mar. 14, 1961

2,975,371

CLIPPING LEVEL CONTROL CIRCUIT

Evon C. Greanias, Binghamton, N.Y., assignor to International Business Machines Corporation, New York, N.Y., a corporation of New York Filed Nov. 24, 1958, Ser. No. 775,968

13 Claims. (Cl. 328—168)

This invention relates to clipping level control circuits, and particularly to an improved clipping level control circuit which governs a data signal level in accordance with the magnitude of preceding and following signals. More particularly the invention relates to a circuit arrangement for integrating a plurality of varying data signals over a predetermined time interval, to govern the transmission level of signals occurring at a predetermined time within the interval.

It is often necessary to control the clipping or transmission level of a varying signal in order to eliminate unwanted spurious signals or noise, and there are known clipping circuits which are arranged to pass signals which exceed, or conversely do not exceed predetermined fixed values. However, where signals and background noise can vary together, such fixed level clipping circuits are not adquate for separating signals from noise, since weak signals may be masked by strong noise, for example.

Particularly in optical character analyzing systems, it is desirable to have the clipping levels vary, so that variations because of differing ink density, background level, etc., can be minimized or eliminated. It has previously been proposed to provide means for integrating the signals derived from scanning a document and using the integrated value for controlling the clipping level of signals passed to the analyzing circuits. However, such arrangements are somewhat lacking from the respect that the integrated signal level represents the immediate past history of the video or scanning signals, and does not compensate for varying conditions at the time or immediately preceding the time of the signals in question.

It is accordingly an object of the present invention to provide an improved circuit for governing transmission of a varying electrical signal in accordance with the immediate values of the signal, both prior and preceding.

Another object of the invention is to provide a circuit for transmitting signals, in which an integrated value of signals in advance of and following a predetermined signal are integrated to provide a control signal which is effective to control the level of the transmitted signal.

A further object of the invention is to provide an improved clipping level control circuit in which the integrated values of signals existing for a predetermined period both before and after the signal in question are used to govern the signal transmission level.

Still another object of the invention is to provide an improved circuit for governing the amplitude of transmitted signals, in which an electrical delay line is employed as a portion of an integrating network which integrates signals prior to and following the signal in question.

A further object of the invention is to provide a circuit of the type described in which an acoustic delay line is employed.

Still a further object of the invention is to provide a circuit of the type described in which a movable recording medium may be employed as a delay device.

A general object of the invention is to provide an improved clipping level control circuit.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a diagrammatic view of a first embodiment of the invention which utilizes an electrical delay line.

Fig. 2 is a diagrammatic view of the details of one form of electrical delay line which may be employed in the system of Fig. 1.

Similar reference characters refer to similar parts in each of the several views.

Figure 3:
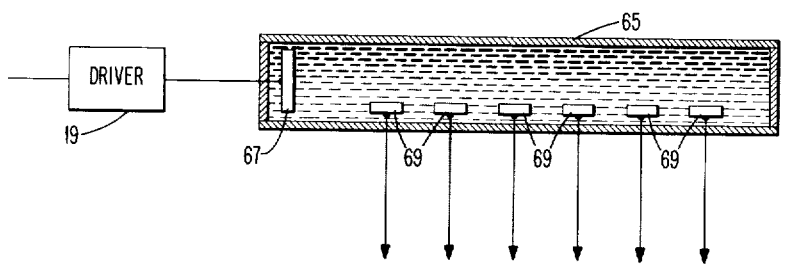
Fig. 3 is a diagrammatic view of an acoustic delay line which may be used in the system of Fig. 1 in lieu of the electrical delay line.

Briefly described, this invention contemplates the use of suitable delay means through which a plurality or train of input signals is passed, the parts and parameters of the delay device being such that a plurality of voltages can be obtained which represent the magnitudes of the signals at a plurality of points along the train of signals. An output is taken from an intermediate point of the delay device and is supplied through an output level control means to an output circuit, the magnitude of signals passed by the level control means being determined by a control signal supplied thereto. This control signal is obtained by summing at least some of the outputs of the delay device, in an impedance network, the control signal so obtained being proportional to the integration of all of the magnitudes of signals obtained from the train of input signals. In this manner, the level of the output signals is determined by both the preceding and the following signals in the input signal train.

Referring now to Fig. 1 of the drawings, there is shown a preferred embodiment of the invention, as employed in a character recognition system.

A document 3, having characters to be analyzed, such as the character "2" shown thereon, is moved, by means not shown, past an analyzing or scanning station, in the direction shown by the arrow. At the scanning station, suitable means in provided for scanning the document and the characters thereon. For the purposes of this disclosure, a flying spot scanner is shown, comprising a cathode ray tube 5, with suitable horizontal and vertical deflection circuits, 7 and 9 respectively, which are governed by suitable synchronizing means 11. The parts are proportioned and arranged so that each character is scanned by a plurality of vertical rasters, each raster comprising a plurality of successive short horizontal scans, successively displaced vertically. One of such vertical rasters is indicated diagrammatically in the drawing, by the plurality of short horizontal lines in a vertical column through the character. The scanning pattern is projected on the document by a suitable lens system, indicated symbolically by reference character 13.

The reflected signals are transduced by a photomultiplier 15 or other suitable device which is effective to change the variations in reflected light to electrical signals to provide trains of scanning or video signals which vary in accordance with the scanning of the character or the document background.

It should be noted that other forms of scanning known in the art can be employed, to provide signals of the same nature. For example, the document can be steadily illuminated and a mechanical scanner of the Nipkow disc type interposed ahead of the photomultiplier to provide a similar type of scanning.

From the foregoing, it is seen that the scanning process provides, for each of a plurality of vertical scans, a succession of signals corresponding to each of the short horizontal scans. These signals will, of course, vary in amplitude depending upon the scanning of document background or portions of the character. Moreover, as previously explained, over a given number of the short horizontal scans, the signals will vary in accordance with ink density, background reflections, and so on.

The video or scanning signals from the photomultiplier 15 are supplied to a video amplifier 17, which may be of conventional design, to thereby amplify them to suitable levels, and are then supplied through a suitable driver amplifier 19 to an electrical delay line 21.

The delay line 21 may be either of the lumped or distributed constant type, and as illustrated in the drawings, has one input terminal thereof connected to a neutral terminal, such as ground. The output is preferably connected to a suitable terminating impedance 23 as shown, or may be open or short circuited, depending upon the parameters of the delay line and in accordance with the requirements of the system. If the delay line is not terminated in its characteristic impedance, then the parameters of the line and the apparatus connected thereto must be such as to eliminate the effects of reflected signals.

The delay line parameters are proportioned and arranged so that a train of signals of desired extent, which may represent a predetermined number of the short horizontal scans, will, when supplied to the delay line, be represented by the voltages existing along the line.

The delay line is tapped at a plurality of locations along its length, and may also have taps at the beginning and end thereof, as indicated in Fig. 1. One possible arrangement is shown in Fig. 2, in which a lumped-constant line, using series inductances 25 and shunt capacitors 27, is provided with taps 29 from the inductances.

The intermediate taps 29, and the end taps 31 and 33 are connected through a corresponding group of impedances such as the resistors 35 to a common connection 37. A selected intermediate one of the delay line taps 39, is also connected to the common connection 37 through a resistor 41, and is provided with a video signal connection 43, which in turn is connected to the grid of a controlled amplifier tube 45. The anode of tube 45 is connected via a load resistor 46 to the positive terminal of a suitable source of direct current, not shown, and the anode is further connected to an output terminal 47. The video or scanning signals are thus obtained from an intermediate tap on delay line 21, and are passed to output terminal 47 via tube 45, the level of the signals which are supplied to the output terminal being determined by the potential at the cathode of tube 45.

To determine the level of the signals passed by tube 45, a suitable control voltage is supplied to the cathode of tube 45, this control voltage being derived in the manner now to be described.

As previously described, the delay line 21 is constructed and arranged so that, at any given time, a predetermined number of the scanning signals will exist along the line, and the voltage seen at different points along the line will represent the varying voltages of the plurality of scanning signals. The impedances 35 and 41, having one terminal thereof connected in common to the common connection 37, function as an additive network, so that the potential of the common connection, being a composite of the voltages seen along the length of the delay line, may be considered as the integral of all of the signals existing at any given time in the delay line.

Limiting of the potentials existing on the connection 37 is provided by the diodes 49 and 51, which are respectively connected to taps 53 and 55 of a voltage divider 57 which is connected at one end to the positive terminal of a source of direct current, and the other end of which is grounded. With the diodes poled as shown, the voltage of connection 37 cannot rise above the voltage at tap 53, nor can it fall lower than the potential at tap 55. Thus the diode clippers 49 and 51 limit the value of the control signal supplied from the delay line and summing network, so that the level does not fall to the point where random noise is effective, when no lines are being scanned, and that the level does not go too high when a large solid black area is scanned. A capacitor 59 is connected between connection 37 and ground, and serves to smooth out any fluctuations due to signals which are shorter than the intervals between successive taps of the delay line.

The potential of connection 37 is supplied to the grid of a cathode follower tube 61, the anode of which is directly connected to the positive terminal of the direct current source, and the cathode of which is connected via resistor 63 to the negative terminal of the direct current source. The cathode of the tube 61 is also connected to the cathode of tube 45, so that the potential of the cathode of tube 45 is determined by the output of cathode follower tube 61, which in turn is dependent upon the integrated control signal derived from the delay line 21 and the impedance network.

From the foregoing, it can be seen that the level of the video or scanning signals supplied from the delay line to the output terminal 47 is continuously varied in accordance with the integrated value of the signals which exist for a predetermined time both before and after the signals in question.

The arrangement according to the present invention provides advantages not realized by previous clipping level control circuits in that the signals preceding as well as the signals following are utilized to set the clipping level for any one signal period. By employing suitable values of impedances or resistances in the summing network, the integration process may be arranged to give more or less weight to the signals preceding the transmitted signal, and to properly apportion the effect of the signals nearer the transmitted signal. Also the summing network resistors may be weighted in such fashion that attenuation in the delay line is compensated.

Although in the disclosed embodiment, the controlled amplifier and the cathode follower are shown and described as vacuum tubes, it is to be understood that other devices such as transistors, magnetic amplifiers, and the like, could be as readily employed.

Fig. 3 shows a modification of the invention in which a delay line of the acoustic type is employed. Construction of such lines is well known in the art and it is deemed sufficient to describe only how such a line could be utilized in the system shown in Fig. 1. The acoustic delay line comprises a suitable housing 65 filled with a medium such as mercury, in which compressional waves may be propagated. A transmitting transducer 67, which may be of the piezoelectric crystal type, for example, is mounted at one end of the line and is electrically connected to the driver 19 so that compressional wave trains are set up in the line corresponding to the trains of scanning signals.

At predetermined intervals along the line, there are located receiving transducers 69, so that as the compressional wave trains travel along the line, voltages are generated in the receiving transducers which are then supplied to a summing network and an output tube as shown in Fig. 1.

Figure 4:
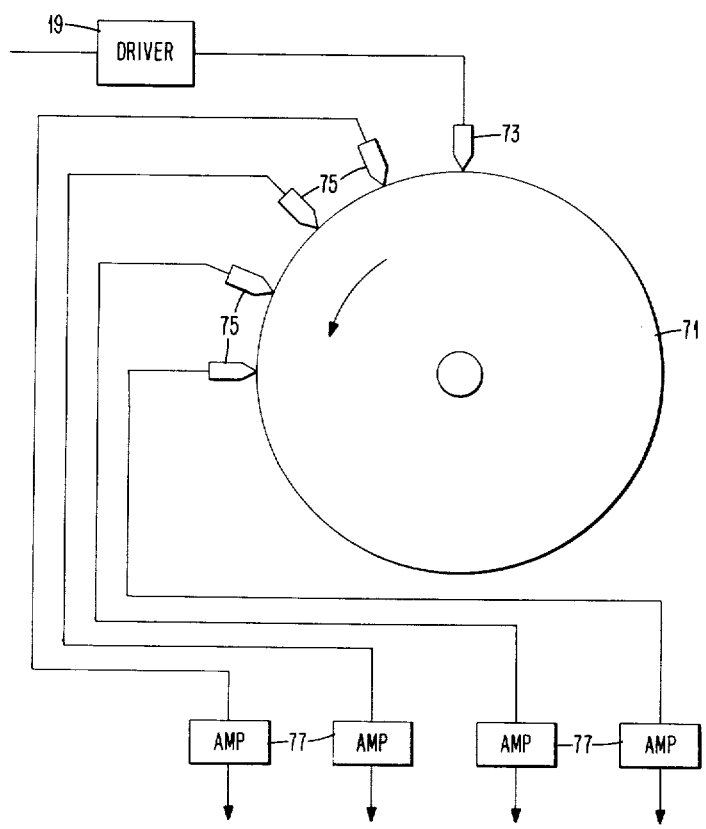
Fig. 4 is a diagrammatic view of a magnetic recording arrangement which may be used in the system of Fig. 1 in lieu of the electrical delay line.

Fig. 4 shows a further modification which may be employed in the system of Fig. 1, in which a movable magnetic recording medium is utilized as a delay device. In the arrangement shown in Fig. 4, a rotating drum having a magnetizable periphery is employed, but obviously other forms of recording mediums such as wires, tapes or discs could be used.

The scanning or video signals from driver 19 are recorded on the surface of the drum 71 via a suitable recording head 73. Spaced along the recording track at suitable intervals, in the direction of rotation of the drum, are a plurality of reproducing heads 75, only four of which are shown. Each reproducing head is provided with suitable amplifying means 77, and the outputs thereof are connected to a summing network and an output circuit in the manner illustrated in Fig. 1. The signal trains are recorded in sequence on the surface of drum 71 by recording head 73, and are reproduced, at selected intervals by the heads 75. Depending upon the type of recording employed, the drum can either have the signals erased therefrom after the signals have passed the last reproducing head, by a suitable erasing head, not shown, or the recording process may be such that subsequent recording obliterates previous recording.

From the foregoing, it can be seen that the present invention provides an arrangement which will set a clipping level for a varying signal in accordance with the integrated level of prior and advance signal values, and can also afford proper weighting of the signals on either side of the transmitted signal.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a source of electrical signals, delay means having an input connected to said source and having a plurality of outputs each of which bears a specific time relationship to the input of said delay means in terms of propagation of a signal therethrough, and each of which outputs provides an output signal proportional to the value of the corresponding time portion of a signal traveling through said delay means, a summing network having a plurality of inputs connected to corresponding outputs of said delay means, and having a common output connection which provides a control signal proportional to the sum of the input signals to the network, controlled amplifier means having a signal input, a signal output, and a control input and effective to transmit signals supplied to said signal input to said signal output at levels determined by the magnitude of a control signal supplied to said control input, circuit means connecting said signal input of said controlled amplifier means to a selected intermediate one of the outputs of said delay means, and other circuit means connecting the common output connection of said summing network to said control input of said controlled amplifier means.

2. A clipping level control circuit, comprising, in combination, a delay device having an input circuit and a plurality of output circuits arranged to provide output voltages proportional to the magnitude of signals existing at a plurality of different delay times with respect to the input of said device, a summing network having a plurality of inputs connected to corresponding output circuits of said delay device and a common output connection which provides a control signal proportional to the sum of the input signals supplied to the network, and voltage discriminator means having an input connection, an output connection and a control connection and effective in accordance with the value of control signals supplied to said control connection to control the level at which input signals supplied to the input connection will produce output signals at the output connection, said input connection of said discriminator means being connected to an intermediate one of said output circuits of said delay device and the control connection of said discriminator means being connected to said common output connection of said summing network.

3. A clipping level control circuit, comprising, in combination, a delay device having an input circuit to which trains of signals are supplied, said trains of signals traveling through said delay device in substantially their original amplitude and time relationships, said delay device having a plurality of output circuits each of which is effective to supply an output voltage indicative of the magnitude of a signal traveling through said delay device at a particular time displacement with respect to the input, a summing network comprising a plurality of impedances, each having one terminal connected to an associated one of said output circuits, the other terminal of said impedances all being connected to a common output connection to provide a control signal proportional to the sum of the outputs of said delay device, and voltage discriminator means having a signal input connection, a signal output connection, and a control connection, and effective to govern the output at said signal output connection of signals supplied to said signal input connection in accordance with the magnitude of signals supplied to said control connection, said signal input connection being connected to an intermediate one of the output circuits of said delay device, and said control connection being connected to the common output connection of said summing network.

4. A clipping level control circuit, comprising, in combination, a delay device having an input circuit to which trains of signals are supplied, said trains of signals traveling through said delay device in substantially their original amplitude and time relationships, said delay device having a plurality of output circuits, each of which is effective to supply an output voltage indicative of the magnitude of a signal traveling through said delay device at a particular time displacement with respect to the input, a summing network comprising a plurality of impedances of graduated values each having one terminal connected to an associated one of said output circuits, the values of the impedances ranging from a high value for those connected to outputs near the input of said delay device to a low value for those connected to outputs removed from the input of said delay device, to thereby compensate for attenuations of signals in said delay device, the other terminals of said impedances all being connected to a common output connection to provide a control signal proportional to the sum of the outputs of said delay device, and voltage discriminator means having a signal input connection, a signal output connection, and a control connection, and effective to govern the output at said signal output connection of signals supplied to said signal input connection in accordance with the magnitude of signals supplied to said control connection, said signal input connection being connected to an intermediate one of the output circuits of said delay device, and said control connection being connected to the common output connection of said summing network.

5. A clipping level control circuit, comprising, in combination, a delay device having an input circuit to which trains of signals are supplied, said trains of signals traveling through said delay device in substantially their original amplitude and time relationships, said delay device having a plurality of output circuits each of which is effective to supply an output voltage indicative of the magnitude of a signal traveling through said delay device at a particular time displacement with respect to the input, a summing network comprising a plurality of impedances, each having one terminal connected to an associated one of said output circuits, the other terminals of said impedances all being connected to a common output connection to provide a control signal proportional to the sum of the outputs of said delay device, limiting means including a pair of diodes connected to sources of potential and to said common connection and effective to limit the excursion of the signals on said common connection between a first and a second magnitude, and a voltage discriminator means having a signal input connection, a signal output connection, and a control connection, and effective to govern the output at said signal output connection of signals supplied to said signal input connection in accordance with the magnitude of signals supplied to said control connection, said signal input connection being connected to an intermediate one of the output circuits of said delay device, and said control connection being connected to the common output connection of said summing network.

6. A clipping level control circuit, comprising, in combination, a delay device having an input circuit to which trains of signals are supplied, said trains of signals traveling through said delay device in substantially their original amplitude and time relationships, said delay device having a plurality of output circuits, each of which is effective to supply an output voltage indicative of the magnitude of a signal traveling through said delay device at a particular time displacement with respect to the input, a summing network comprising a plurality of impedances of graduated values each having one terminal connected to an associated one of said output circuits, the values of the impedances ranging from a high value for those connected to outputs near the input of said delay device to a low value for those connected to outputs removed from the input of said delay device, to thereby compensate for attenuations of signals in said delay device, the other terminals of said impedances all being connected to a common output connection to provide a control signal proportional to the sum of the outputs of said delay device, limiting means including a pair of diodes connected to sources of potential and to said common connection and effective to limit the excursion of the signals on said common connection between a first and a second magnitude, and voltage discriminator means having a signal input connection, a signal output connection, and a control connection, and effective to govern the output at said signal output connection of signals supplied to said signal input connection in accordance with the magnitude of signals supplied to said control connection, said signal input connection being connected to an intermediate one of the output circuits of said delay device, and said control connection being connected to the common output connection of said summing network.

7. A clipping level control circuit, comprising, in combination, an electrical delay line having an input to which trains of signals are supplied, said trains of signals traveling through said delay line in substantially their original amplitude and time relationships, a plurality of taps along said delay line, a summing network including a plurality of inputs connected to corresponding taps on said delay line and having a common output connection which provides a control signal proportional to the sum of the signals supplied to the network from said delay line, and voltage discriminator means having a signal input connection, a signal output connection, and a control connection, and effective to govern the output at said signal output connection of signals supplied to said signal input connection in accordance with the magnitude of signals supplied to said control connection, said signal input connecton being connected to an intermediate one of the taps of said delay line, and said control connection being connected to the common output connection of said summing network.

8. A clipping level control circuit comprising, in combination, an electrical delay line having an input to which trains of signals are supplied, said trains of signals traveling through said delay line in substantially their original amplitude and time relationships, a plurality of taps along said line, a summing network comprising a plurality of resistors of graduated values each having one terminal connected to an associated one of said taps, the values of the resistors ranging from a high value for those connected to taps near the input of said delay line to a low value for those connected to taps removed from the input of said delay line, to thereby compensate for attenuations of signals in said delay line, the other terminals of said resistors all being connected to a common output connection to provide a control signal proportional to the sum of the outputs of said delay line, and voltage discriminator means having a signal input connection, a signal output connection, and a control connection, and effective to govern the output at said signal output connection of signals supplied to said signal input connection in accordance with the magnitude of signals supplied to said control connection, said signal input connection being connected to an intermediate one of the taps of said delay line, and said control connection being connected to the common output connection of said summing network.

9. A clipping level control circuit comprising, in combination, a compressional wave delay device having an input transducer to which trains of signals are supplied to set up corresponding compressional wave trains in said device, a plurality of output transducers located at spaced intervals along said delay device and effective to provide output signals indicative of the magnitude and time relationships of the compressional waves in said device, a summing network comprising a plurality of impedances, each having one terminal connected to an associated one of said output transducers, the other terminals of said impedances all being connected to a common output connection to provide a control signal proportional to the sum of the outputs of said delay device, and voltage discriminator means having a signal input connection, a signal output connection, and a control connection, and effective to govern the output at said signal output connection of signals supplied to said signal input connection in accordance with the magnitude of signals supplied to said control connection, said signal input connection being connected to an intermediate one of the output transducers of said delay device, and said control connection being connected to the common output connection of said summing network.

10. A clipping level control circuit comprising, in combination, a compressional wave delay device having an input transducer to which trains of signals are supplied to set up corresponding compressional wave trains in said device, a plurality of output transducers located at spaced intervals along said delay device and effective to provide output signals indicative of the magnitude and time relationships of the compressional waves in said device, a summing network comprising a plurality of resistors of graduated values, each having one terminal connected to an associated one of said output circuits, the values of the resistors ranging from a high value for those connected to output transducers near the input of said delay device to a low value for those connected to output transducers removed from the input of said delay device, to thereby compensate for attenuations of signals in said delay device, the other terminals of said resistors all being connected to a common output connection to provide a control signal proportional to the sum of the outputs of said delay device, and voltage discriminator means having a signal input connection, a signal output connection, and a control connection, and effective to govern the output at said signal output connection of signals supplied to said signal input connection in accordance with the magnitude of signals supplied to said control connection, said signal input connection being connected to an intermediate one of the output transducers of said delay device, and said control connection being connected to the common output connection of said summing network.

11. A clipping level control circuit comprising, in combination, a movable recording medium, recording means for recording trains of signals on said medium, a plurality of reproducing means spaced at intervals along said recording medium for reproducing the signals recorded thereon, a summing network having a plurality of inputs connected to corresponding ones of said reproducing means and having a common output connection and effective to provide a control signal at said common output connection proportional to the sum of the signals supplied to said inputs, controlled amplifier means having a signal input, a signal output, and a control input and effective to transmit signals supplied to said signal input to said signal output at levels determined by the magnitude of a control signal supplied to said control input, circuit means connecting said signal input of said controlled amplifier means to a selected intermediate one of said reproducing means, and other circuit means connecting the common output connection of said summing network to said control input of said controlled amplifier means.

12. A clipping level control circuit comprising, in combination, a movable magnetic recording medium, recording means for recording trains of signals on said medium, a summing network having a plurality of inputs connected to corresponding ones of said reproducing means and having a common output connection and effective to provide a control signal at said common output connection proportional to the sum of the signals supplied to said inputs, controlled amplifier means having a signal input, a signal output, and a control input and effective to transmit signals supplied to said signal input to said signal output at levels determined by the magnitude of a control signal supplied to said control input, circuit means connecting said signal input of said controlled amplifier means to a selected intermediate one of said reproducing means, and other circuit means connecting the common output connection of said summing network to said control input of said controlled amplifier means.

13. A clipping level control circuit as claimed in claim 12, in which the movable magnetic recording medium comprises a rotatable drum having a magnetizable periphery.

References Cited in the file of this patent

UNITED STATES PATENTS

| | | |
|---|---|---|
| 2,299,945 | Wendt | Oct. 27, 1942 |
| 2,662,977 | DeRosa | Dec. 15, 1953 |
| 2,707,751 | Hance | May 3, 1955 |